United States Patent
Rao

(10) Patent No.: US 11,528,717 B2
(45) Date of Patent: Dec. 13, 2022

(54) QOS-AWARE ASYMMETRICAL UPLINK-DOWNLINK PAIRING

(71) Applicant: Parallel Wireless, Inc., Nashua, NH (US)

(72) Inventor: Prashanth Rao, Wilmington, MA (US)

(73) Assignee: Parallel Wireless, Inc., Nashua, NH (US)

( * ) Notice: Subject to any disclaimer, the term of this patent is extended or adjusted under 35 U.S.C. 154(b) by 0 days.

(21) Appl. No.: 17/069,859

(22) Filed: Oct. 13, 2020

(65) Prior Publication Data
US 2021/0410152 A1 Dec. 30, 2021

Related U.S. Application Data

(60) Provisional application No. 62/914,047, filed on Oct. 11, 2019.

(51) Int. Cl.
*H04W 72/08* (2009.01)
*H04W 72/04* (2009.01)

(52) U.S. Cl.
CPC ....... *H04W 72/087* (2013.01); *H04W 72/042* (2013.01); *H04W 72/0413* (2013.01)

(58) Field of Classification Search
CPC ............. H04W 72/087; H04W 72/042; H04W 72/0413
See application file for complete search history.

(56) References Cited

U.S. PATENT DOCUMENTS

| | | | |
|---|---|---|---|
| 8,867,418 B2 | 10/2014 | Mishra et al. |
| 8,879,416 B2 | 11/2014 | Mishra et al. |
| 9,455,959 B1 | 9/2016 | Garg et al. |
| 9,832,796 B2 | 11/2017 | Mehta |
| 9,986,597 B2 | 5/2018 | Mishra et al. |
| 10,129,158 B2 | 11/2018 | Garg |
| 10,327,185 B2 | 6/2019 | Agarwal et al. |
| 10,595,242 B2 | 3/2020 | Rao et al. |

(Continued)

FOREIGN PATENT DOCUMENTS

| | | |
|---|---|---|
| EP | 2773151 A1 | 9/2014 |
| WO | 2013145592 A1 | 10/2013 |

*Primary Examiner* — Rasheed Gidado
(74) *Attorney, Agent, or Firm* — Michael Y. Saji; David W. Rouille

(57) ABSTRACT

Methods are disclosed creating sector-carriers with unequal pairing of uplink and downlink bandwidths. In one embodiment a method includes determining, at a SON controller, a downlink required rate and a corresponding estimated downlink bandwidth required; determining, at the SON controller, an uplink required rate and a corresponding estimated uplink bandwidth required; determining, at the SON controller, an aggregate bandwidth of spectrum suitable for downlink operation; determining, at the SON controller, an aggregate bandwidth of spectrum suitable for uplink operation; and determining from the downlink required rate; the corresponding estimated downlink bandwidth required; the uplink required rate; the corresponding estimated uplink bandwidth required; the aggregate bandwidth of spectrum suitable for downlink operation; and the aggregate bandwidth of spectrum suitable for uplink operation, at least one sector-carrier configuration wherein the uplink data rate is different than the downlink data rate.

11 Claims, 4 Drawing Sheets

(56) References Cited

U.S. PATENT DOCUMENTS

| | | |
|---|---|---|
| 10,856,325 B2 * | 12/2020 | Kim .................... H04W 74/006 |
| 11,129,240 B2 | 9/2021 | Mishra et al. |
| 2003/0112858 A1 * | 6/2003 | Wang .................... H04M 3/007 |
| | | 375/222 |
| 2006/0274734 A1 * | 12/2006 | DeMartino ......... H04L 12/2856 |
| | | 370/352 |
| 2011/0044285 A1 | 2/2011 | Jang et al. |
| 2012/0213072 A1 * | 8/2012 | Kotecha ............ H04W 28/0268 |
| | | 370/235 |
| 2014/0241316 A1 | 8/2014 | Okmyanskiy et al. |
| 2014/0362758 A1 * | 12/2014 | Lee .................... H04W 72/0446 |
| | | 370/312 |
| 2015/0098387 A1 | 4/2015 | Garg et al. |
| 2017/0055186 A1 | 2/2017 | Donepudi et al. |
| 2017/0272330 A1 | 9/2017 | Cao et al. |
| 2017/0273134 A1 | 9/2017 | Cao et al. |
| 2017/0353912 A1 * | 12/2017 | Einhaus ................. H04L 5/001 |
| 2018/0070369 A1 * | 3/2018 | Papasakellariou ......................... |
| | | H04W 72/1215 |
| 2020/0221428 A1 * | 7/2020 | Moon .................... H04W 16/28 |

\* cited by examiner

QOS-AWARE ASYMMETRICAL UPLINK-DOWNLINK PAIRING

CROSS-REFERENCE TO RELATED APPLICATIONS

This application claims priority under 35 U.S.C. § 119(e) to U.S. Provisional Pat. App. No. 62/914,047, filed Oct. 11, 2019, titled "Creating Sector-Carriers With Unequal Pairing Of Uplink And Downlink Bandwidths To Match Differing Uplink And Downlink Performance Needs". The present application hereby incorporates by reference each of the following: U.S. Pat. App. Pub. Nos. US20110044285, US20140241316; WO Pat. App. Pub. No. WO2013145592A1; EP Pat. App. Pub. No. EP2773151A1; U.S. Pat. No. 8,879,416, "Heterogeneous Mesh Network and Multi-RAT Node Used Therein," filed May 8, 2013; U.S. Pat. No. 8,867,418, "Methods of Incorporating an Ad Hoc Cellular Network Into a Fixed Cellular Network," filed Feb. 18, 2014; U.S. patent application Ser. No. 14/777,246, "Methods of Enabling Base Station Functionality in a User Equipment," filed Sep. 15, 2016; U.S. patent application Ser. No. 14/289,821, "Method of Connecting Security Gateway to Mesh Network," filed May 29, 2014; U.S. patent application Ser. No. 14/642,544, "Federated X2 Gateway," filed Mar. 9, 2015; U.S. patent application Ser. No. 14/711,293, "Multi-Egress Backhaul," filed May 13, 2015; U.S. Pat. App. No. 62/375,341, "S2 Proxy for Multi-Architecture Virtualization," filed Aug. 15, 2016; U.S. patent application Ser. No. 15/132,229, "MaxMesh: Mesh Backhaul Routing," filed Apr. 18, 2016, each in its entirety for all purposes, respectively. This application also hereby incorporates by reference in their entirety each of the following U.S. Pat. applications or Pat. App. Publications: US20150098387A1; US20170055186A1; US20170273134A1; US20170272330A1; and Ser. No. 15/713,584. This application also hereby incorporates by reference in their entirety U.S. patent application Ser. No. 16/424,479,"5G Interoperability Architecture," filed May 28, 2019; and U.S. Provisional Pat. Application No. 62/804,209,"5G Native Architecture," filed Feb. 11, 2019.

BACKGROUND

In typical Long term Evolution (LTE) Frequency Division Duplex (FDD) systems, the bandwidths allocated to each of the paired uplink and downlinks are identical. There exist scenarios in which the data rates expected in uplink and downlink are well known and vastly different.

SUMMARY

In an optimal allocation scheme, it is desirable to pair the uplink and downlink bandwidths in a sector-carrier such that the apportioning of bandwidth to uplink and downlink matches the traffic requirements on that link. From the superset of allocated spectrum blocks, a novel method is required that creates multiple sector-carriers with uplink and downlink pairing in each such that the downlink vs uplink apportioning of the total spectrum is in proportion to the data rates expected on the downlink and uplink, respectively.

In one embodiment a method for creating sector-carriers with unequal pairing of uplink and downlink bandwidths to match differing uplink and downlink performance needs comprises: determining, at a SON controller, a downlink required rate and a corresponding estimated downlink bandwidth required; determining, at the SON controller, an uplink required rate and a corresponding estimated uplink bandwidth required; determining, at the SON controller, an aggregate bandwidth of spectrum suitable for downlink operation; determining, at the SON controller, an aggregate bandwidth of spectrum suitable for uplink operation; and determining from the downlink required rate; the corresponding estimated downlink bandwidth required; the uplink required rate; the corresponding estimated uplink bandwidth required; the aggregate bandwidth of spectrum suitable for downlink operation; and the aggregate bandwidth of spectrum suitable for uplink operation, at least one sector-carrier configuration wherein the uplink data rate is much greater than a downlink data rate or the downlink data rate is much great than the uplink data rate.

In another embodiment a method converting a symmetrically paired uplink (UL)-downlink (DL) symmetrical spectrum allocation to an allocation where an uplink bandwidth is greater than a downlink bandwidth includes, in a sector-carrier's downlink, operating a PHY layer as symmetrically paired spectrum with bandwidth on DL and UL equal to UL bandwidth, and trimming DL spectrum by suppressing radio transmissions on either side of the symmetrical DL bandwidth equally; confining PHICH allocations to the desired actual transmission BW of the DL; confining PDSCH and PDCCH allocations to the desired actual transmission BW of the DL; setting the Frequency Information data fields of a SIB2 block to reflect the true uplink bandwidth; and in the Master Information Block, setting the bandwidth operation to reflect the true size of the downlink bandwidth.

In another embodiment, a method converting a symmetrically paired FDD uplink-downlink symmetrical spectrum allocation to an asymmetrical allocation where downlink bandwidth is greater than uplink bandwidth includes, in the sector-carrier's uplink, operating the PHY layer as symmetrically paired spectrum with bandwidth on DL and UL equal to UL bandwidth, and trimming UL spectrum by suppressing radio transmissions on either side of the symmetrical UL bandwidth equally; setting the Frequency Information data fields of SIB2 to reflect the true uplink bandwidth; in the Master Information Block, setting the bandwidth to operation to reflect the true size of the downlink bandwidth; in the sector-carrier's uplink, shifting the PUCCH blocks that would normally have been at both ends of the symmetrical uplink spectrum to the ends of the curtailed true uplink spectrum; and in the sector-carrier's uplink scheduler instructing the PHY to look for the PUCCH blocks in the new locations and scheduling all uplink transmissions only in the curtailed uplink bandwidth.

DETAILED DESCRIPTION

Commercial networks do not usually encounter asymmetrical spectrum allocation for uplink and downlink. The standard does not explicitly teach how to implement asymmetrical spectrum allocation. This involves intelligently creating sector-carriers with a goal of meeting the differing uplink and downlink needs of the network. The LTE implementation on the UE can be influenced to follow this idea. This is true in some special purpose applications of LTE. By novel application of SON concepts, LTE standards text, eNB stack and signal processing aspects to provide a solution.

Figure 1:
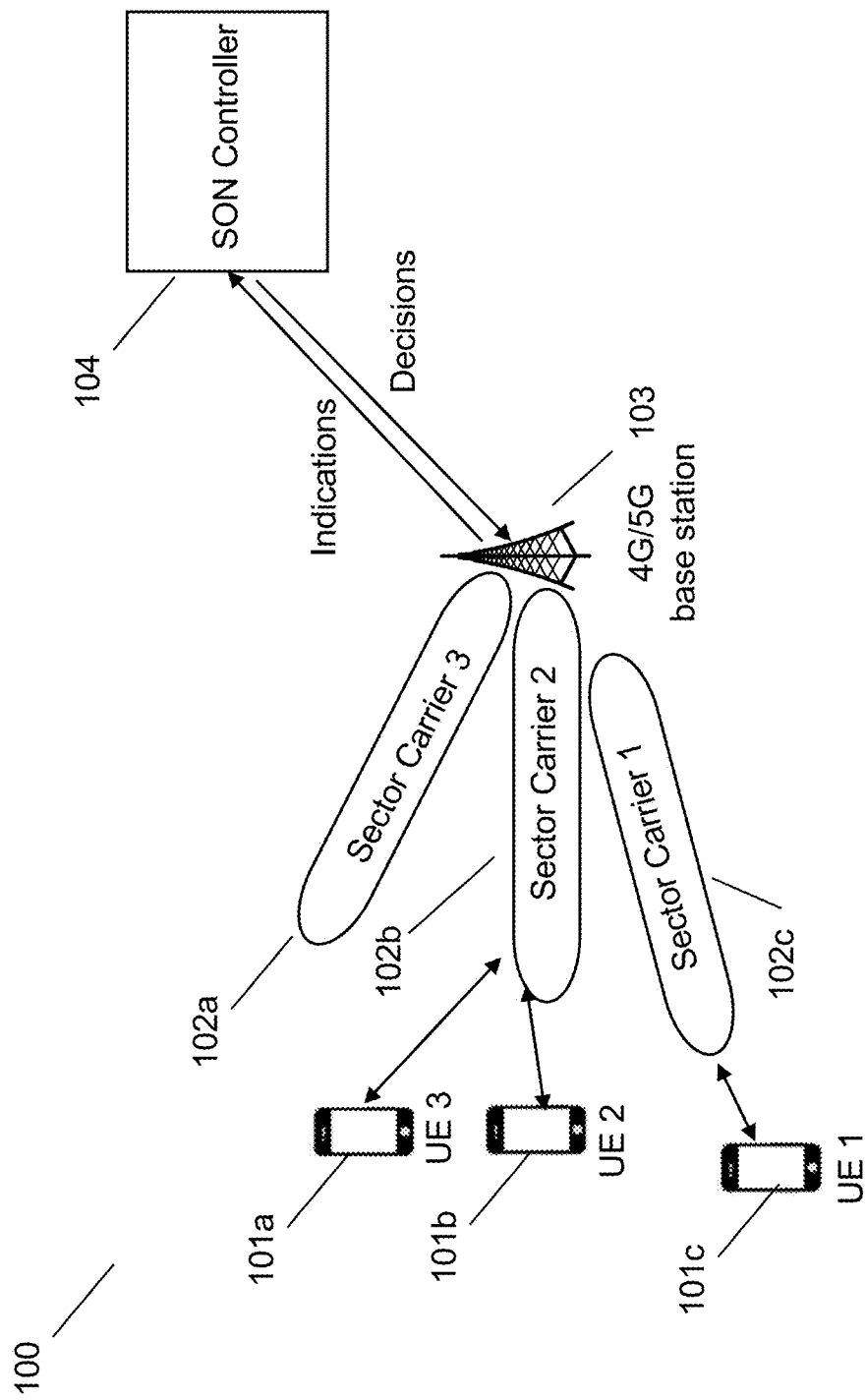
FIG. 1 is an architecture diagram, in accordance with some embodiments.

FIG. 1 is an architecture diagram which shows a system 100 includes a self-organizing network (SON) controller 104 controller; a base transceiver station (BTS) 103 in communication with the SON controller; a plurality of sector carriers 102a, 102b and 102c in communication with the BTS; and at least one user equipment 101a, 101b, 101c in communication with one of the plurality of sector carriers. The SON controller 104 provides multiple sector-carriers with uplink and downlink pairing in each such that the downlink versus uplink apportioning of the total spectrum is in proportion to the data rates expected on the downlink and uplink, respectively.

The sector-carriers are coordinated by a single Self Organizing Network Controller ("SON Controller"). The SON Controller may be cloud based software.

The SON Controller determines by computation or by configuration the following:

$R_{downlink}$ is the downlink required rate. Correspondingly, $B_{downlink}$ is the estimated downlink bandwidth required.

$R_{uplink}$ is the uplink required rate. Correspondingly, $B_{uplink}$ is the estimated uplink bandwidth required.

$BW_{Total\_DL}$ is the aggregate bandwidth of the spectrum suitable for downlink operation.

$BW_{Total\_UL}$ is the aggregate bandwidth of the spectrum suitable for uplink operation.

The SON Controller creates one or more sector-carriers as follows and sends sector-carriers' configuration information to the LTE base stations that implement the sector-carriers.

Case 1: Uplink Data Rate is expected to be much greater than downlink data rate

From $BW_{Total\_UL}$, carve out as large, in terms of bandwidth, a piece of contiguous uplink spectrum that is suitable to operate a LTE sector-carrier satisfying all of the conditions listed below. Let the size of this chunk be designated as $BW_{chunk}$.

The size of this uplink spectrum must be from the set of allowed LTE bandwidths. For example, 1.4 MHz, 3 MHz, 5 MHz, 10 MHz, 20 MHz . . . etc.

If $BW_{chunk\_uplink} > B_{uplink}$, it must be the closest fit to $B_{uplink}$.

Compute the minimum Downlink spectrum, $BW_{chunk\_downlink}$, needed for pairing, selected form the set of allowed LTE bandwidths as follows:

$$BW_{chunk\_downlink} = BW_{chunk\_uplink} * (B_{downlink}/B_{uplink})$$

The size of this downlink spectrum must be from the set of allowed LTE bandwidths. For example, 1.4 MHz, 3 MHz, 5 MHz, 10 MHz, 20 MHz . . . etc.

Optionally, if $BW_{chunk\_downlink} > B_{downlink}$, it must be the closest fit to $B_{downlink}$.

When (a), (b) and (c) are simultaneously satisfied, the downlink and uplink resources, namely $BW_{chunk\_downlink}$ and $BW_{chunk\_uplink}$, respectively, can be paired to form a sector-carrier for LTE operation.

Repeat steps (a) through (c) of forming the sector-carriers until sufficient sector-carriers are formed to satisfy the uplink spectrum $B_{uplink}$ demand.

On each such LTE sector-carrier, in LTE protocol's System Information Block 2, set the Uplink Carrier Frequency and Uplink Bandwidth correctly to reflect the uplink allocation on the sector-carrier.

The LTE UE implements the method whereby its uplink spectrum configuration is determined by reading the Uplink Carrier Frequency and Uplink Bandwidth information transmitted on System Information Block 2 (SIB2) on the LTE downlink.

Case 2: Downlink Data Rate is expected to be much greater than uplink data rate

The algorithm is the same as in Case 1 but the roles of uplink and downlink are reversed from that in the method of Case 1.

Converting a symmetrically paired LTE FDD uplink-downlink symmetrical spectrum allocation to an asymmetrical allocation where uplink bandwidth is greater than downlink bandwidth:

In the LTE sector-carrier's downlink:

Operate the PHY layer as symmetrically paired spectrum with bandwidth on DL and UL equal to UL bandwidth. Trim DL spectrum by suppressing radio transmissions on either side of the symmetrical DL bandwidth equally.

Confine PHICH allocations to the desired actual transmission BW of the DL.

Confine PDSCH and PDCCH allocations to the desired actual transmission BW of the DL.

Set the Frequency Information data fields of LTE's SIB2 to reflect the true uplink bandwidth.

In the LTE Master Information Block, set the bandwidth to operation to reflect the true size of the downlink bandwidth.

Converting a symmetrically paired LTE FDD uplink-downlink symmetrical spectrum allocation to an asymmetrical allocation where downlink bandwidth is greater than uplink bandwidth:

In the LTE sector-carrier's uplink:

Operate the PHY layer as symmetrically paired spectrum with bandwidth on DL and UL equal to UL bandwidth. Trim UL spectrum by suppressing radio transmissions on either side of the symmetrical UL bandwidth equally.

Set the Frequency Information data fields of LTE's SIB2 to reflect the true uplink bandwidth.

In the LTE Master Information Block, set the bandwidth to operation to reflect the true size of the downlink bandwidth.

In the sector-carrier's uplink, shift the PUCCH blocks that would normally have been at both ends of the symmetrical uplink spectrum to the ends of the curtailed true uplink spectrum.

In the LTE sector-carrier's uplink scheduler:

Instruct the LTE PHY to look for the PUCCH blocks in the new locations specified in step (d) immediately above this sentence.

Schedule all uplink transmissions only in the curtailed uplink bandwidth

Figure 2:
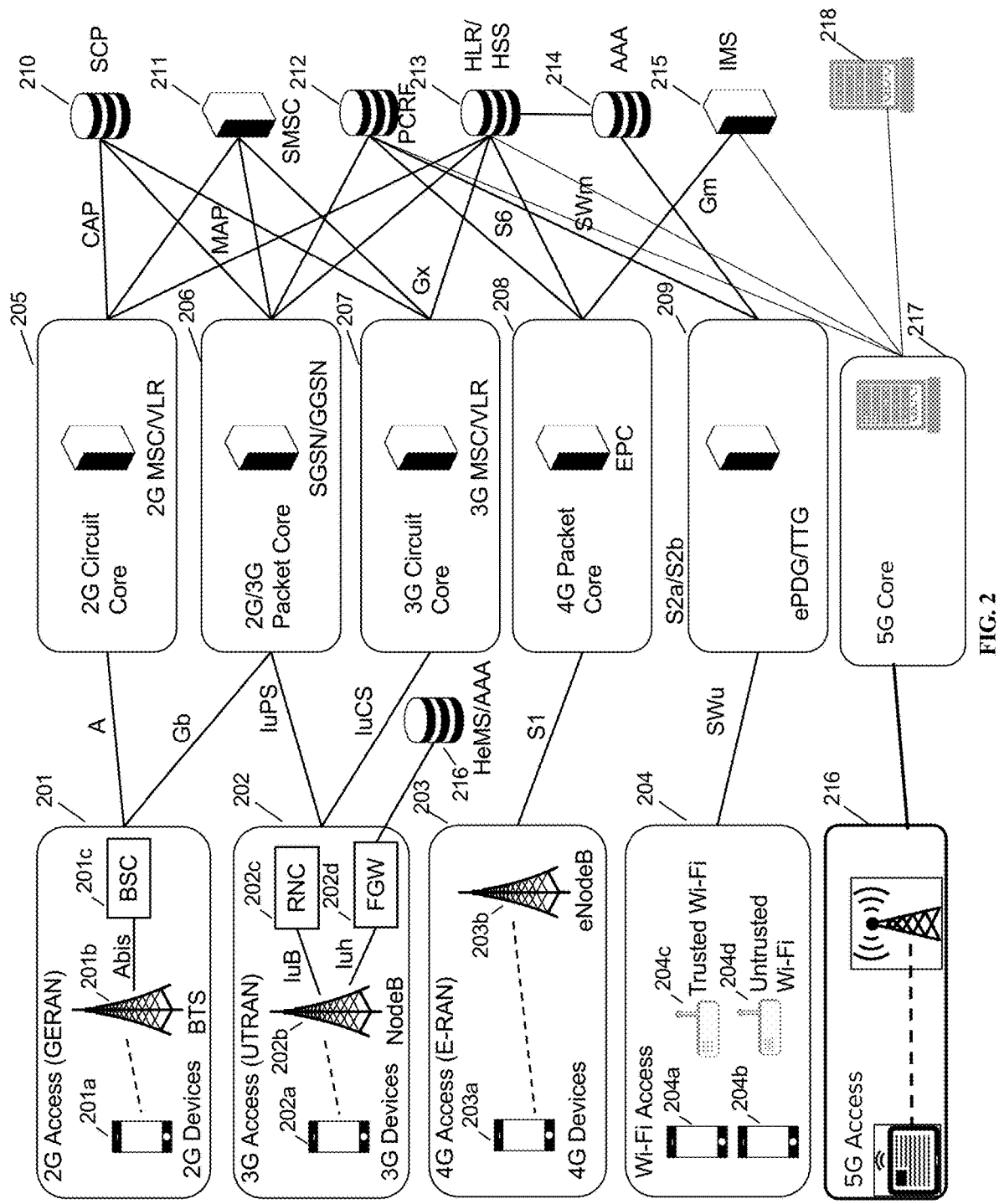
FIG. 2 is a schematic network architecture diagram for various radio access technology core networks.

FIG. 2 is a schematic network architecture diagram for 3G and other-G prior art networks. The diagram shows a plurality of "Gs," including 2G, 3G, 4G, 5G and Wi-Fi. 2G is represented by GERAN 101, which includes a 2G device 201a, BTS 201b, and BSC 201c. 3G is represented by UTRAN 202, which includes a 3G UE 202a, nodeB 202b, RNC 202c, and femto gateway (FGW, which in 3GPP namespace is also known as a Home nodeB Gateway or HNBGW) 202d. 4G is represented by EUTRAN or E-RAN 203, which includes an LTE UE 203a and LTE eNodeB 203b. Wi-Fi is represented by Wi-Fi access network 204, which includes a trusted Wi-Fi access point 204c and an untrusted Wi-Fi access point 204d. The Wi-Fi devices 204a and 204b may access either AP 204c or 204d. In the current network architecture, each "G" has a core network. 2G circuit core network 205 includes a 2G MSC/VLR; 2G/3G packet core network 206 includes an SGSN/GGSN (for EDGE or UMTS packet traffic); 3G circuit core 207 includes a 3G MSC/VLR; 4G circuit core 208 includes an evolved packet core (EPC); and in some embodiments the Wi-Fi access network may be connected via an ePDG/TTG using S2a/S2b. Each of these nodes are connected via a number of different protocols and interfaces, as shown, to other, non-"G"-specific network nodes, such as the SCP 230, the SMSC 231, PCRF 232, HLR/HSS 233, Authentication, Authorization, and Accounting server (AAA) 234, and IP Multimedia Subsystem (IMS) 235. An HeMS/AAA 236 is present in some cases for use by the 3G UTRAN. The diagram is used to indicate schematically the basic functions of each network as known to one of skill in the art, and is not intended to be exhaustive. For example, 2G core 217 is shown using a single interface to 2G access 216, although in some cases 2G access can be supported using dual connectivity or via a non-standalone deployment architecture.

Noteworthy is that the RANs 201, 202, 203, 204 and 236 rely on specialized core networks 205, 206, 207, 208, 209, 237 but share essential management databases 230, 231, 232, 233, 234, 235, 238. More specifically, for the 2G GERAN, a BSC 201c is required for Abis compatibility with BTS 201b, while for the 3G UTRAN, an RNC 202c is required for Iub compatibility and an FGW 202d is required for Iuh compatibility. These core network functions are separate because each RAT uses different methods and techniques. On the right side of the diagram are disparate functions that are shared by each of the separate RAT core networks. These shared functions include, e.g., PCRF policy functions, AAA authentication functions, and the like. Letters on the lines indicate well-defined interfaces and protocols for communication between the identified nodes.

The system may include 2G equipment. 2G networks are digital cellular networks, in which the service area covered by providers is divided into a collection of small geographical areas called cells. Analog signals representing sounds and images are digitized in the phone, converted by an analog to digital converter and transmitted as a stream of bits. All the 2G wireless devices in a cell communicate by radio waves with a local antenna array and low power automated transceiver (transmitter and receiver) in the cell, over frequency channels assigned by the transceiver from a common pool of frequencies, which are reused in geographically separated cells. The local antennas are connected with the telephone network and the Internet by a high bandwidth optical fiber or wireless backhaul connection.

5G uses millimeter waves which have shorter range than microwaves, therefore the cells are limited to smaller size. Millimeter wave antennas are smaller than the large antennas used in previous cellular networks. They are only a few inches (several centimeters) long. Another technique used for increasing the data rate is massive MIMO (multiple-input multiple-output). Each cell will have multiple antennas communicating with the wireless device, received by multiple antennas in the device, thus multiple bitstreams of data will be transmitted simultaneously, in parallel. In a technique called beamforming the base station computer will continuously calculate the best route for radio waves to reach each wireless device, and will organize multiple antennas to work together as phased arrays to create beams of millimeter waves to reach the device.

Figure 3:
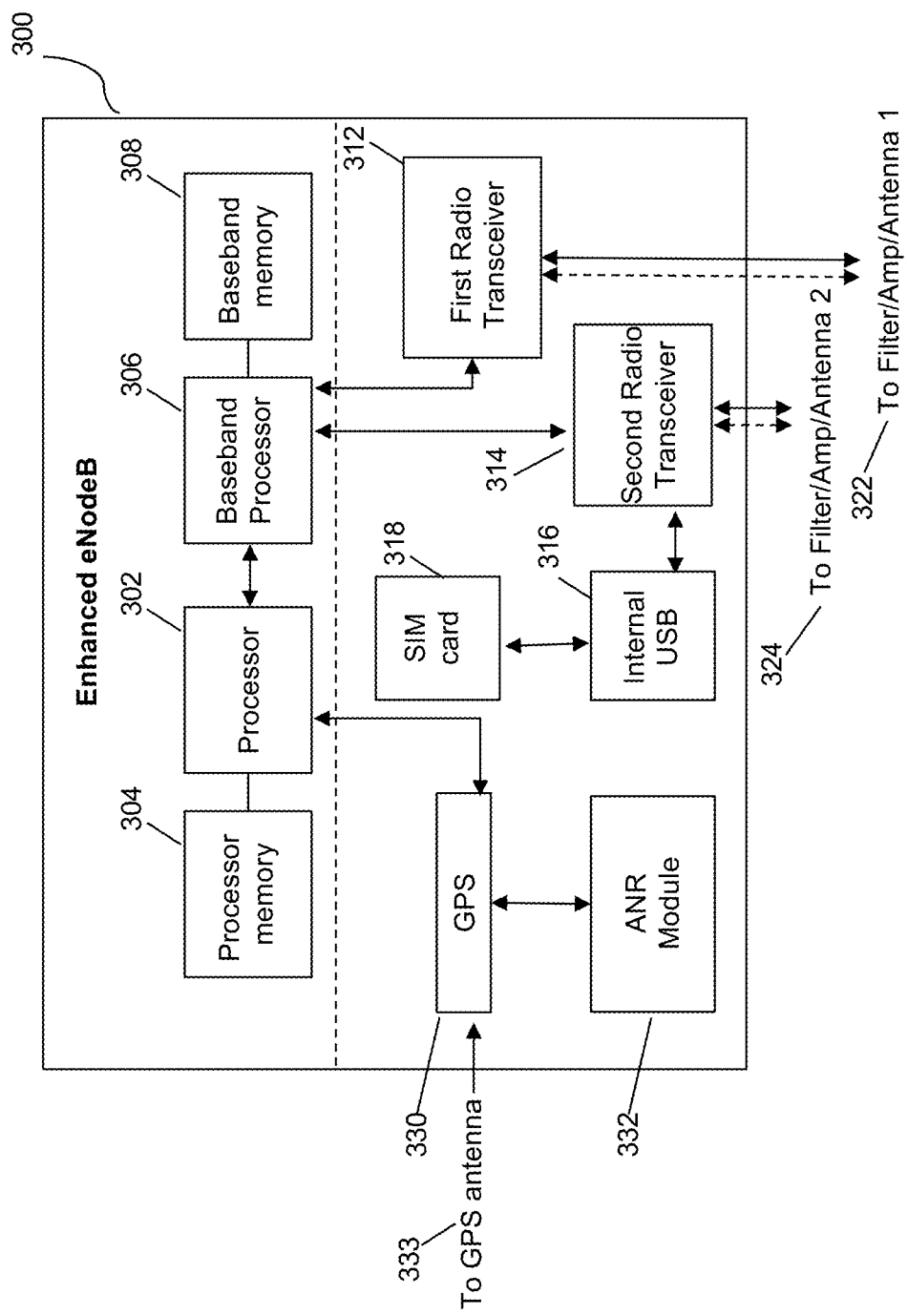
FIG. 3 is an enhanced eNodeB for performing the methods described herein, in accordance with some embodiments.

FIG. 3 is an enhanced eNodeB for performing the methods described herein, in accordance with some embodiments. eNodeB 500 may include processor 302, processor memory 304 in communication with the processor, baseband processor 306, and baseband processor memory 308 in communication with the baseband processor. Mesh network node 300 may also include first radio transceiver 312 and second radio transceiver 314, internal universal serial bus (USB) port 316, and subscriber information module card (SIM card) 318 coupled to USB port 316. In some embodiments, the second radio transceiver 314 itself may be coupled to USB port 316, and communications from the baseband processor may be passed through USB port 316. The second radio transceiver may be used for wirelessly backhauling eNodeB 300.

Processor 302 and baseband processor 306 are in communication with one another. Processor 302 may perform routing functions, and may determine if/when a switch in network configuration is needed. Baseband processor 306 may generate and receive radio signals for both radio transceivers 312 and 314, based on instructions from processor 302. In some embodiments, processors 302 and 306 may be on the same physical logic board. In other embodiments, they may be on separate logic boards.

Processor 302 may identify the appropriate network configuration, and may perform routing of packets from one network interface to another accordingly. Processor 302 may use memory 304, in particular to store a routing table to be used for routing packets. Baseband processor 306 may perform operations to generate the radio frequency signals for transmission or retransmission by both transceivers 310 and 312. Baseband processor 306 may also perform operations to decode signals received by transceivers 312 and 314. Baseband processor 306 may use memory 308 to perform these tasks.

The first radio transceiver 312 may be a radio transceiver capable of providing LTE eNodeB functionality, and may be capable of higher power and multi-channel OFDMA. The second radio transceiver 314 may be a radio transceiver capable of providing LTE UE functionality. Both transceivers 312 and 314 may be capable of receiving and transmitting on one or more LTE bands. In some embodiments, either or both of transceivers 312 and 314 may be capable of providing both LTE eNodeB and LTE UE functionality. Transceiver 312 may be coupled to processor 302 via a Peripheral Component Interconnect-Express (PCI-E) bus, and/or via a daughtercard. As transceiver 314 is for providing LTE UE functionality, in effect emulating a user equipment, it may be connected via the same or different PCI-E bus, or by a USB bus, and may also be coupled to SIM card 318. First transceiver 312 may be coupled to first radio frequency (RF) chain (filter, amplifier, antenna) 322, and second transceiver 314 may be coupled to second RF chain (filter, amplifier, antenna) 324.

SIM card 318 may provide information required for authenticating the simulated UE to the evolved packet core (EPC). When no access to an operator EPC is available, a local EPC may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 300 is not an ordinary UE but instead is a special UE for providing backhaul to device 300.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 312 and 314, which may be Wi-Fi 802.11a/b/g/n/ac/ad/ah, Bluetooth, ZigBee, microwave (including line-of-sight microwave), or another wireless backhaul connection. Any of the wired and wireless connections described herein may be used flexibly for either access (providing a network connection to UEs) or backhaul (providing a mesh link or providing a link to a gateway or core network), according to identified network conditions and needs, and may be under the control of processor 302 for reconfiguration.

A GPS module 330 may also be included, and may be in communication with a GPS antenna 332 for providing GPS coordinates, as described herein. When mounted in a vehicle, the GPS antenna may be located on the exterior of the vehicle pointing upward, for receiving signals from overhead without being blocked by the bulk of the vehicle or the skin of the vehicle. Automatic neighbor relations (ANR) module 332 may also be present and may run on processor 302 or on another processor, or may be located within another device, according to the methods and procedures described herein.

Other elements and/or modules may also be included, such as a home eNodeB, a local gateway (LGW), a self-organizing network (SON) module, or another module. Additional radio amplifiers, radio transceivers and/or wired network connections may also be included.

Figure 4:
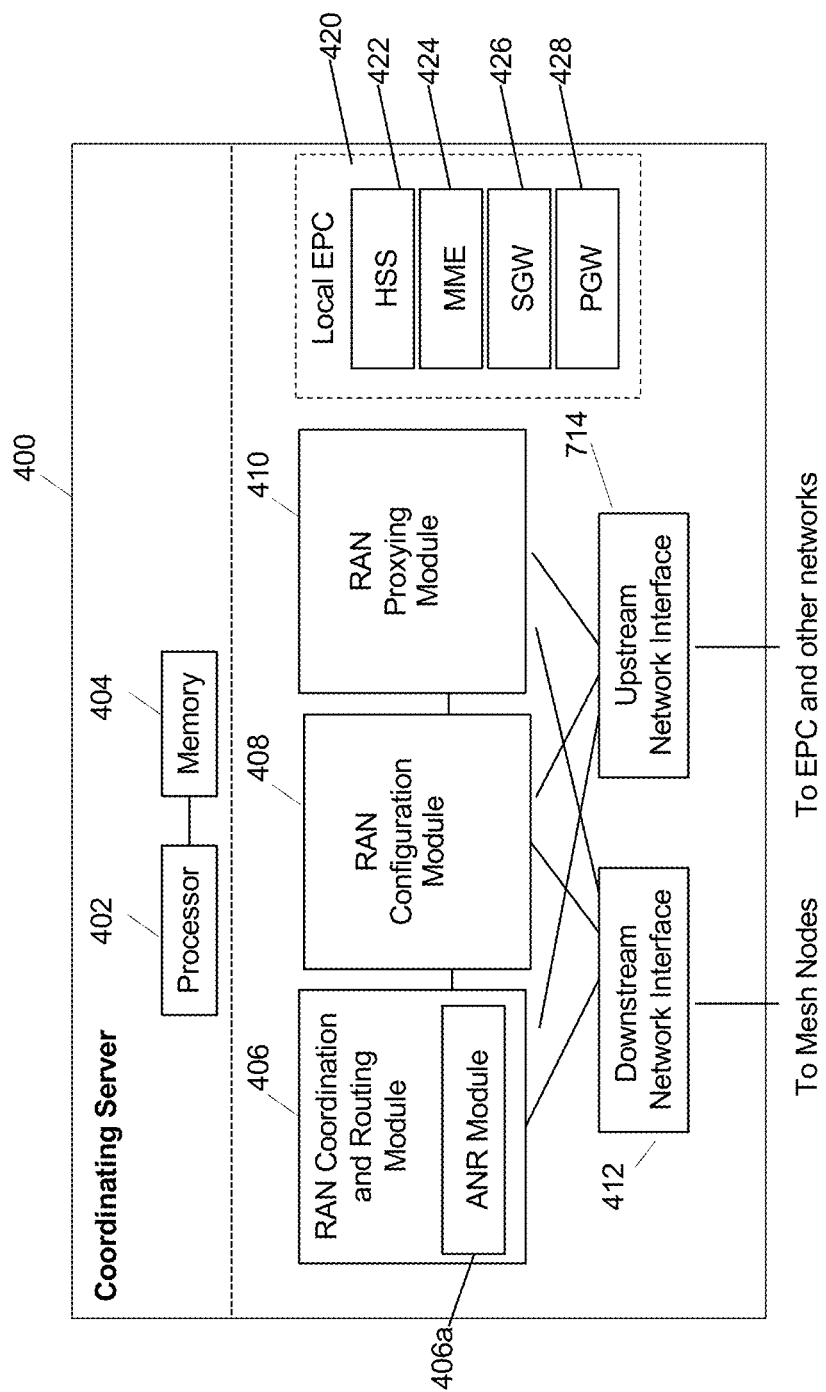
FIG. 4 is a coordinating server for providing services and performing methods as described herein, in accordance with some embodiments.

FIG. 4 is a coordinating server for providing services and performing methods as described herein, in accordance with some embodiments. Coordinating server 400 includes processor 402 and memory 404, which are configured to provide the functions described herein. Also present are radio access network coordination/routing (RAN Coordination and routing) module 406, including ANR module 406a, RAN configuration module 408, and RAN proxying module 410. The ANR module 406a may perform the ANR tracking, PCI disambiguation, ECGI requesting, and GPS coalescing and tracking as described herein, in coordination with RAN coordination module 406 (e.g., for requesting ECGIs, etc.). In some embodiments, coordinating server 400 may coordinate multiple RANs using coordination module 406. In some embodiments, coordination server may also provide proxying, routing virtualization and RAN virtualization, via modules 410 and 408. In some embodiments, a downstream network interface 412 is provided for interfacing with the RANs, which may be a radio interface (e.g., LTE), and an upstream network interface 414 is provided for interfacing with the core network, which may be either a radio interface (e.g., LTE) or a wired interface (e.g., Ethernet).

Coordinator 400 includes local evolved packet core (EPC) module 420, for authenticating users, storing and caching priority profile information, and performing other EPC-dependent functions when no backhaul link is available. Local EPC 420 may include local HSS 422, local MME 424, local SGW 426, and local PGW 428, as well as other modules. Local EPC 420 may incorporate these modules as software modules, processes, or containers. Local EPC 420 may alternatively incorporate these modules as a small number of monolithic software processes. Modules 406, 408, 410 and local EPC 420 may each run on processor 402 or on another processor, or may be located within another device.

In any of the scenarios described herein, where processing may be performed at the cell, the processing may also be performed in coordination with a cloud coordination server. A mesh node may be an eNodeB. An eNodeB may be in communication with the cloud coordination server via an X2 protocol connection, or another connection. The eNodeB may perform inter-cell coordination via the cloud communication server, when other cells are in communication with the cloud coordination server. The eNodeB may communicate with the cloud coordination server to determine whether the UE has the ability to support a handover to Wi-Fi, e.g., in a heterogeneous network.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders as necessary.

Although the above systems and methods for providing interference mitigation are described in reference to the Long Term Evolution (LTE) standard, one of skill in the art would understand that these systems and methods could be adapted for use with other wireless standards or versions thereof. The inventors have understood and appreciated that the present disclosure could be used in conjunction with various network architectures and technologies. Wherever a 4G technology is described, the inventors have understood that other RATs have similar equivalents, such as a gNodeB for 5G equivalent of eNB, including specifically 5G, as the 5G technology significantly overlaps with 4G. Wherever an MME is described, the MME could be a 3G RNC or a 5G AMF/SMF. Additionally, wherever an MME is described, any other node in the core network could be managed in much the same way or in an equivalent or analogous way, for example, multiple connections to 4G EPC PGWs or SGWs, or any other node for any other RAT, could be periodically evaluated for health and otherwise monitored, and the other aspects of the present disclosure could be made to apply, in a way that would be understood by one having skill in the art.

Additionally, the inventors have understood and appreciated that it is advantageous to perform certain functions at a coordination server, such as the Parallel Wireless HetNet Gateway, which performs virtualization of the RAN towards the core and vice versa, so that the core functions may be statefully proxied through the coordination server to enable the RAN to have reduced complexity. Therefore, at least four scenarios are described: (1) the selection of an MME or core node at the base station; (2) the selection of an MME or core node at a coordinating server such as a virtual radio network controller gateway (VRNCGW); (3) the selection of an MME or core node at the base station that is connected to a 5G-capable core network (either a 5G core network in a 5G standalone configuration, or a 4G core network in 5G non-standalone configuration); (4) the selection of an MME or core node at a coordinating server that is connected to a 5G-capable core network (either 5G SA or NSA). In some embodiments, the core network RAT is obscured or virtualized towards the RAN such that the coordination server and not the base station is performing the functions described herein, e.g., the health management functions, to ensure that the RAN is always connected to an appropriate core network node. Different protocols other than S1AP, or the same protocol, could be used, in some embodiments.

In some embodiments, the software needed for implementing the methods and procedures described herein may be implemented in a high level procedural or an object-oriented language such as C, C++, C #, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, 2G, 3G, 5G, TDD, or other air interfaces used for mobile telephony.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, or to networks for additional protocols that utilize radio frequency data transmission. Various components in the devices described herein may be added, removed, split across different devices, combined onto a single device, or substituted with those having the same or similar functionality.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment.

The invention claimed is:

1. A method for creating sector-carriers with unequal pairing of uplink and downlink bandwidths to match differing uplink and downlink performance needs, the method comprising:
   determining, at a Self Organizing Network (SON) controller, a downlink required rate and a corresponding estimated downlink bandwidth required;
   determining, at the SON controller, an uplink required rate and a corresponding estimated uplink bandwidth required;
   determining, at the SON controller, an aggregate bandwidth of spectrum suitable for downlink operation;
   determining, at the SON controller, an aggregate bandwidth of spectrum suitable for uplink operation; and
   determining at least one sector-carrier configuration wherein the uplink data rate is greater than a downlink data rate or the downlink data rate is greater than the uplink data rate from one or more of the downlink required rate; the corresponding estimated downlink bandwidth required; the uplink required rate; the corresponding estimated uplink bandwidth required; the aggregate bandwidth of spectrum suitable for downlink operation; and the aggregate bandwidth of spectrum suitable for uplink operation; and
   determining a section of contiguous uplink spectrum suitable to operate a LTE sector-carrier and when the section of contiguous uplink spectrum is greater than the estimated uplink bandwidth required, using the section of contiguous uplink spectrum that is the closest available fit to the estimated uplink bandwidth required.

2. The method of claim 1 wherein the uplink data rate is greater than the downlink data rate further comprising determining from the aggregate bandwidth of spectrum suitable for uplink operation a section of contiguous uplink spectrum suitable to operate a LTE sector-carrier satisfying at least one condition.

3. The method of claim 1 further comprising determining a minimum downlink spectrum needed for pairing with the section of contiguous uplink spectrum.

4. The method of claim 3 wherein the minimum downlink spectrum needed is determined by dividing the estimated downlink bandwidth required by estimated uplink bandwidth and multiplying the result by the section of contiguous uplink spectrum.

5. The method of claim 4 further comprising pairing the section of contiguous uplink spectrum and the minimum downlink spectrum needed to form a sector-carrier for LTE operation.

6. The method of claim 1 wherein the downlink data rate is greater than the uplink data rate further comprising determining from the aggregate bandwidth of spectrum suitable for downlink operation a section of contiguous downlink spectrum suitable to operate a Long Term Evolution (LTE) sector-carrier satisfying at least one condition.

7. The method of claim 6 wherein when the section of contiguous downlink spectrum is greater than the estimated downlink bandwidth required, the section of contiguous downlink spectrum that is the closest fit to the estimated downlink bandwidth required is used.

8. The method of claim 4 further comprising determining a minimum uplink spectrum needed for pairing with the section of contiguous downlink spectrum.

9. The method of claim 8 wherein the minimum uplink spectrum needed is determined by dividing the estimated uplink bandwidth required by estimated downlink bandwidth and multiplying the result by the section of contiguous downlink spectrum.

10. The method of claim 9 further comprising pairing the section of contiguous downlink spectrum and the minimum uplink spectrum needed to form a sector-carrier for LTE operation.

11. A method converting a symmetrically paired Long Term Evolution (LTE) Frequency Division Duplex (FDD) uplink-downlink symmetrical spectrum allocation to an asymmetrical allocation where downlink bandwidth is greater than uplink bandwidth, comprising:
  in the LTE sector-carrier's uplink:
    operating the PHY layer as symmetrically paired spectrum with bandwidth on Downlink (DL) and Uplink equal to UL bandwidth, and trimming UL spectrum by suppressing radio transmissions on either side of the symmetrical UL bandwidth equally;
  setting the Frequency Information data fields of LTE's System Information Block (SIB) to reflect the true uplink bandwidth;
  in the LTE Master Information Block, setting the bandwidth to operation to reflect the true size of the downlink bandwidth;
  in the sector-carrier's uplink, shifting the Physical Uplink Control Channel (PUCCH) blocks that would normally have been at both ends of the symmetrical uplink spectrum to the ends of the curtailed true uplink spectrum;
  in the LTE sector-carrier's uplink scheduler instructing the LTE PHY to look for the PUCCH blocks in the new locations and scheduling all uplink transmissions only in the curtailed uplink bandwidth.

* * * * *